United States Patent
Fukano

(10) Patent No.: US 7,052,215 B2
(45) Date of Patent: May 30, 2006

(54) CUTTING TOOL WITH SENSOR AND PRODUCTION METHOD THEREFOR

(75) Inventor: Tsuyoshi Fukano, Sendai (JP)

(73) Assignee: Kyocera Corporation, Kyoto (JP)

( * ) Notice: Subject to any disclaimer, the term of this patent is extended or adjusted under 35 U.S.C. 154(b) by 457 days.

(21) Appl. No.: 10/107,722

(22) Filed: Mar. 25, 2002

(65) Prior Publication Data

US 2003/0017018 A1 Jan. 23, 2003

(30) Foreign Application Priority Data

| Mar. 29, 2001 | (JP) | ............................ 2001-096104 |
| Mar. 29, 2001 | (JP) | ............................ 2001-096105 |
| Mar. 29, 2001 | (JP) | ............................ 2001-096106 |
| Mar. 29, 2001 | (JP) | ............................ 2001-096107 |

(51) Int. Cl.
*B23B 27/16* (2006.01)

(52) U.S. Cl. .......................... 407/113; 407/120; 451/9; 451/10; 451/11

(58) Field of Classification Search ............... 407/113, 407/120; 408/6, 11; 700/175; 73/73, 104, 73/7; 324/679, 680; 451/9, 10, 11; 83/62.1, 83/76.8, 835
See application file for complete search history.

(56) References Cited

U.S. PATENT DOCUMENTS

| 4,620,281 | A | * | 10/1986 | Thompson et al. ......... 700/176 |
| 4,694,686 | A | * | 9/1987 | Fildes et al. ................... 73/104 |
| 4,744,241 | A | * | 5/1988 | Mayer .......................... 73/104 |
| 4,927,300 | A | * | 5/1990 | Ramalingam et al. ...... 407/120 |
| 5,042,309 | A | * | 8/1991 | Kitamura ................. 73/862.49 |
| 5,176,053 | A | * | 1/1993 | Alvelid et al. ................ 82/173 |
| 5,864,241 | A | * | 1/1999 | Schreck et al. ............. 324/699 |
| 6,456,054 | B1 | * | 9/2002 | Kataoka ..................... 324/71.2 |
| 6,471,449 | B1 | * | 10/2002 | Kataoka ..................... 407/119 |
| 6,526,814 | B1 | * | 3/2003 | Kataoka ...................... 73/104 |
| 6,591,689 | B1 | * | 7/2003 | Nidan et al. .................. 73/754 |

FOREIGN PATENT DOCUMENTS

| JP | 59-081043 | 5/1984 |
| JP | 62-088552 | 4/1987 |

* cited by examiner

*Primary Examiner*—Boyer D. Ashley
*Assistant Examiner*—Sara Addisu
(74) *Attorney, Agent, or Firm*—Hogan & Hartson, LLP

(57) ABSTRACT

A cutting tool with a sensor according to the present invention includes an electrically conductive substrate, an insulation film provided on a surface of the electrically conductive substrate, and a sensor circuit of an electrically conductive film provided on the insulation film. The insulation film includes two consecutive insulation layers. Even if the plural insulation layers each have defects such as cracks and pinholes which possibly impair the insulation property impair the insulation film, the defects present in the plural layers are unlikely to be continuous. Therefore, the insulation film has an improved insulation reliability, thereby ensuring proper function of the sensor circuit in the cutting tool.

5 Claims, 8 Drawing Sheets

CUTTING TOOL WITH SENSOR AND PRODUCTION METHOD THEREFOR

BACKGROUND OF THE INVENTION

1. Field of the Invention

The present invention relates to a cutting tool and a production method therefor. More particularly, the invention relates to a cutting tool having a sensor circuit for detecting the end of the service life of the cutting tool and to a production method therefor.

2. Description of Related Art

The end of the service life of a cutting tool having a cutting edge defined along an intersection ridge between a rake face and a flank is generally judged on the basis of the amount of wear of the flank. For highly accurate machining, it is imperative to speedily determine the amount of the wear of the flank on an in-process basis during a cutting operation. However, it is very difficult in view of a machining environment to directly observe the wear of the tool during the machining.

Therefore, the determination of the amount of the wear of the tool is generally achieved by interrupting the machining, detaching the tool and observing the tool by means of an optical microscope. Alternatively, where it is desired to determine the wear amount on an in-process basis during the machining, a phenomenon (a change in cutting power and vibrations) occurring due to the wear of the tool is detected by means of a sensor provided in the vicinity of a machining point on a machine tool, and a detection signal is processed for estimation of the wear amount.

However, the quantitative determination of the wear amount on an in-process basis is difficult, failing to provide satisfactory sensitivity and reliability.

There is also proposed a method in which the end of the service life of the cutting tool is automatically judged by detecting the amount of the wear of the cutting edge of the cutting tool. In this method, a self-diagnosis is made on the end of the service life of the tool by detecting the amount of the wear of the cutting tool. Where this method is applied to an electrically conductive tool, an electrically conductive line is embedded in an insulation layer, and the wear limit of the tool and the cut-off of the electrically conductive line are detected on the basis of a signal outputted when the electrically conductive line is cut off in a cutting operation (see Japanese Unexamined Patent Publication No. 62-88552 (1987)).

There is also provided a method in which a cutting tool including an electrically conductive substrate having a surface coated with an insulative aluminum oxide film is provided, and a voltage is applied between a workpiece and the tool for detection of the end of the service life of the cutting tool. That is, the end of the service life of the tool is judged by detecting a flow of an electric current when the aluminum oxide film is worn out (see Japanese Unexamined Patent Publication No. 59-81043 (1984)).

In these methods, the insulation state of the insulation layer is very important. In the method proposed in the Japanese Unexamined Patent Publication No. 62-88552, an aluminum oxide film is formed as the insulation layer by a CVD method or a PVD method. Where a cemented carbide substrate or a cermet substrate is coated with the aluminum oxide film which has a thermal expansion coefficient different from that of the substrate by the CVD method, the aluminum oxide film suffers from minute cracks extending to the substrate after the coating. When an electrically conductive sensor film is formed on the aluminum oxide film, the electrically conductive substrate and the electrically conductive sensor film are shorted through the cracks.

Where the aluminum oxide film is formed by the PVD method, the aluminum oxide film suffers from defects such as pinholes extending to the substrate, and the electrically conductive substrate and the electrically conductive sensor film are shorted through the pinholes. Further, an electrically conductive unreacted product may remain in the insulation layer depending on the state of the substrate. These problems make it very difficult to produce a sensor circuit having a stable sensor function.

In the method proposed in Japanese Unexamined Patent Publication No. 59-81043, the aluminum oxide film needs to have a thickness of at least 10 μm to 100 μm to ensure a satisfactory insulation property. This is because minute cracking and chipping are present in the aluminum oxide film.

This is conceptually illustrated in FIG. 1. In FIG. 1, the electrically conductive film, the insulation layer and the electrically conductive substrate are denoted by reference numerals 1, 2 and 3, respectively. There are further shown a defect 4 such as a crack or a pinhole and a defect 5 such as electrically conductive grains. If the defects 4, 5 (e.g., cracks, pinholes and electrically conductive grains) possibly causing a short circuit are present in the insulation layer 2, the electrically conductive substrate 3 and the electrically conductive film 1 are shorted via the defects 4, 5 when the electrically conductive sensor circuit is produced. This hinders proper function of the sensor circuit, and reduces the reliability of the sensor circuit.

To cope with the aforesaid problems, there have been proposed various types of sensor-incorporating tools, but none of them have been put to practical use. That is, small-volume production of such tools is possible on an experimental basis, but the tools are not feasible as cutting tools.

On the other hand, where the thickness of the insulation layer is increased for elimination of the influences of the cracking and chipping present in the insulation layer as proposed in Japanese Unexamined Patent Publication No. 59-81043, the tool has a deteriorated cutting performance and a poorer chipping resistance.

In view of the foregoing, it is an object of the present invention to provide a cutting tool which is highly reliable in determining the end of the service life thereof, and to provide a production method therefor.

SUMMARY OF THE INVENTION

A cutting tool with a sensor according to the present invention has a feature described below to achieve the aforesaid object.

More specifically, the cutting tool with the sensor comprises an electrically conductive substrate, an insulation film provided on a surface of the electrically conductive substrate, and a sensor circuit of an electrically conductive film provided on the insulation film, wherein the insulation film has a defect eliminating arrangement for eliminating a defect possibly present therein and impairing an insulation property thereof.

This arrangement improves the insulation reliability of the insulation film, and ensures proper function of the sensor circuit of the cutting tool.

The defect eliminating arrangement of the insulation film comprises at least two consecutive insulation layers.

Alternatively, the defect eliminating arrangement is such that electrically conductive substances possibly present in the insulation film are discontinuous along the thickness of the insulation film.

According to the present invention, a method for producing a cutting tool with a sensor has a feature described below to achieve the aforesaid object.

More specifically, the method for producing the cutting tool with the sensor comprises the steps of: forming an insulation layer on a surface of an electrically conductive substrate; and forming a sensor circuit of an electrically conductive film on the insulation layer, wherein the insulation layer is subjected to a defect eliminating process for elimination of a defect possibly present therein and impairing an insulation property thereof after the formation of the insulation layer on the surface of the electrically conductive substrate. Thus, the cutting tool with the sensor can be produced which achieves the object of the present invention.

The defect eliminating process may be achieved, for example, by etching and/or rinsing a surface of the insulation layer after the formation of the insulation layer on the electrically conductive substrate, and forming a second insulation layer on the first insulation layer.

Alternatively, the defect eliminating process may be achieved by subjecting the insulation layer to an oxidation process described below.

DESCRIPTION OF THE PREFERRED EMBODIMENTS

Throw-away tools according to embodiments of the present invention will hereinafter be described. It is noted that the invention is applicable not only to the throw-away tools but also to drills and the like.

Figure 1:
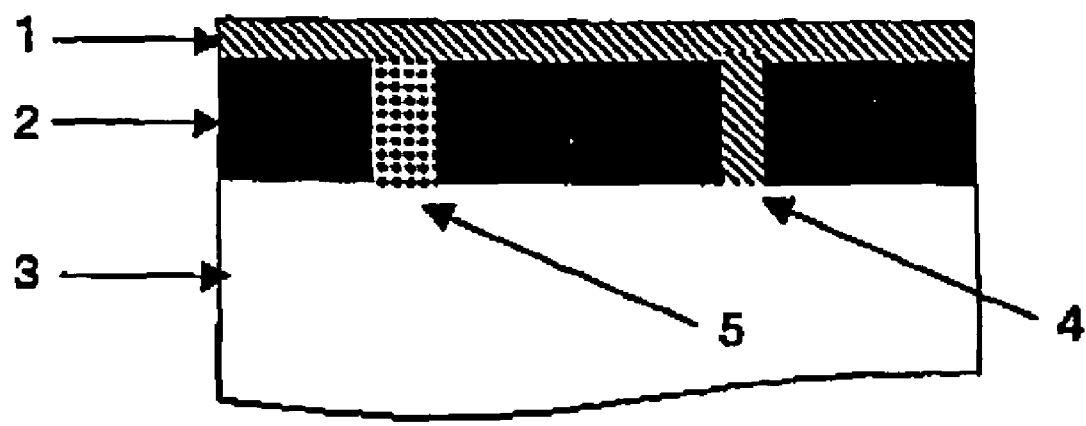
FIG. 1 is a schematic diagram for explaining defects possibly impairing the insulation property of an insulation layer of a cutting tool with a sensor.
Figure 2:
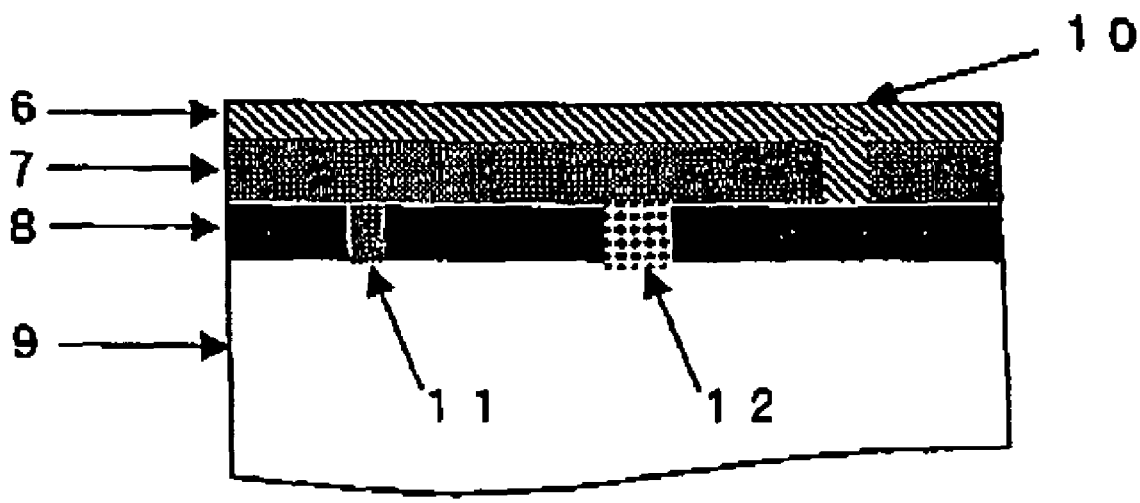
FIG. 2 is a diagram illustrating a cutting tool with a sensor according to a first embodiment of the present invention.

FIG. 2 illustrates a cutting tool with a sensor according to a first embodiment of the present invention. In FIG. 2, there are shown an electrically conductive film 6 (which serves as a sensor circuit), first and second insulation layers 8 and 7, an electrically conductive substrate 9, a defect 10 such as a crack or a pinhole present in the second insulation layer, a defect 11 such as a crack or a pinhole present in the first insulation layer, and a defect 12 such as electrically conductive grains present in the first insulation layer.

The tool with the sensor includes two or more insulation layers (i.e., the insulation layers 7, 8) consecutively stacked. With this arrangement, the electrically conductive film 6 is prevented from intruding into the defects 11, 12 during the formation of the electrically conductive film in the subsequent step in a production process. Thus, a short circuit between the electrically conductive substrate 9 and the electrically conductive sensor circuit can be prevented, ensuring proper function of the sensor circuit. That is, the defects 11, 12 produced in the first insulation layer 8 are filled or covered with the second insulation layer 7. A component of the electrically conductive film 6 which may cause a short circuit intrudes into the defect 10 formed in the second insulation layer 7 during the formation of the electrically conductive film 6, but the first insulation layer 8 prevents the short circuit between the electrically conductive substrate 9 and the electrically conductive film 6.

Exemplary materials for the electrically conductive substrate 9 include an aluminum oxide ceramic, a silicon nitride ceramic, a cermet, a cemented carbide, a cubic boron nitride (CBN) ceramic and a polycrystalline diamond (PCD) ceramic. The electrically conductive substrate 9 composed of any of these materials may be coated with a hard film (not shown) of a carbide, a nitride, a carbonitride or an oxide of at least one element selected from Groups 4a, 5a and 6a in the periodic table by a PVD method and/or a CVD method.

The aluminum oxide ceramic may comprise, for example, 2 wt % to 40 wt % of TiC, not smaller than 0.01 wt % of an oxide of at least one of Fe, Ni and Co, and the balance of $Al_2O_3$ and inevitable impurities.

The silicon nitride ceramic may comprise, for example, 1.5 mol % to 10 mol % of Al on an $Al_2O_3$ basis, 30 mol % to 80 mol % of titanium carbide, nitride or carbonitride, and the balance of silicon nitride, not greater than 10 wt % of an oxide of a rare earth element based on silicon nitride and not greater than 10 mol % of impurity oxygen on an $SiO_2$ basis.

An example of the cermet is a TiCN-based cermet which comprises 50 wt % to 80 wt % of Ti on a carbide, nitride or carbonitride basis and 10 wt % to 40 wt % of an element selected from Group 6a in the periodic table on a carbide basis, wherein a hard phase component having an atomic ratio of nitrogen to carbon plus nitrogen of 0.4 to 0.6 is present in a proportion of 70 wt % to 90 wt % and a binder phase component of an iron group element is present in a proportion of 10 wt % to 30 wt %.

The cemented carbide may comprise, for example, a hard phase and a binder phase, wherein the hard phase comprises tungsten carbide and optionally a carbide, a nitride or a carbonitride of an element selected from Groups 4a, 5a and 6a in the periodic table substituted for 5 wt % to 15 wt % of tungsten carbide, and the binder phase essentially comprises an iron group metal such as Co, for example, in a proportion of 5 wt % to 15 wt %.

Examples of the coating film (not shown) include a layer of a carbide, a nitride or a carbonitride of Ti having a thickness of 0.1 µm to 10 µm, a layer of an oxide of Al having a thickness of 0.1 µm to 10 µm, and a nitride of TiAl having a thickness of 0.1 µm to 10 µm. The substrate composed of the cemented carbide, the cermet or the ceramic is coated with one or more of these layers.

The formation of the insulation layers 7, 8 which insulate the electrically conductive film 6 from the electrically conductive substrate 9 is achieved by a CVD method, a PCVD method, a PVD method such as an ion plating method, a sputtering method or an evaporation method, or a plating method. Where the insulation layer 7 or 8 is formed of aluminum oxide by the sputtering method, for example, the sputtering is performed in an Ar atmosphere with the use of an aluminum oxide target. More specifically, at least 1-minute pre-sputtering for cleaning the target, at least 1-minute etching on the substrate and at least 1-minute pre-sputtering for cleaning the target are carried out, followed by 5- to 200-minute main sputtering for deposition of aluminum oxide depending on the thickness of the insulation layer. Where the formation of the insulation layer 7 or 8 is achieved by the CVD method, $H_2$ gas is used as a carrier gas, and $CO_2$, HCl and $AlCl_3$ are used in combination as a reaction gas. In the CVD method, a film depositing temperature is 850° C. to 1100° C., and an internal pressure of a CVD chamber is 40 mbar to 300 mbar. An insulative material such as aluminum nitride, silicon nitride, zirconium oxide or titanium oxide may be used as the material for the insulation layers 7, 8.

The total thickness of the insulation layers 7 and 8 is preferably 0.1 µm to 20 µm. The thickness of each of the insulation layers 7 and 8 is not smaller than 0.5 µm, preferably not smaller than 0.6 µm. If the thickness of the insulation layer 7, 8 is smaller than 0.1 µm, an insulative effect may be lost. The thickness of each of the insulation layers 7, 8 is not greater than 20 µm, preferably not greater than 10 µm. If the thickness of the insulation layer 7, 8 is greater than 20 µm, the cutting performance (particularly, chipping resistance) is adversely affected.

Exemplary materials for the electrically conductive film 6 include metal materials such as metals of Groups 4a, 5a and 6a in the periodic table (e.g., Ti, Zr, V, Nb, Ta, Cr, Mo and W), iron group metals (e.g., Co, Ni and Fe) and Al, and carbides, nitrides, carbonitrides of metals of Groups 4a, 5a and 6a in the periodic table (e.g., TiC, VC, NbC, TaC, $Cr_3C_2$, $MO_2C$, WC, $W_2C$, TiN, VN, NbN, TaN, CrN, TICN, VCN, NbCN, TaCN and CrCN) and (Ti,Al)N. Among these materials, TiN is particularly preferred because TiN has great adhesion to the substrate of the throw-away tip. In addition, TiN is not reactive with a workpiece. Therefore, the sensor circuit formed of TiN can constantly provide a predetermined electrical resistance value and accurately detect the wear and chipping of the throw-away tip, and the workpiece is free from a surface scratch which may otherwise be caused by a reaction product. Further, TiN is excellent in oxidation resistance, so that the sensor circuit formed of TiN can accurately detect the wear and chipping of the throw-away tip without variations in electrical resistance which may otherwise occur due to production of an oxide.

By employing the CVD method, the PVD method (e.g., the ion plating method, the sputtering method or the evaporation method) or the plating method, the electrically conductive film can be formed on the generally entire surface of the substrate of the throw-away tip.

The electrically conductive film 6 preferably has a thickness of 0.05 µm to 20 µm. If the thickness of the electrically conductive film 6 is smaller than 0.05 µm, the electrically conductive film has poorer adhesion to the surface of the substrate, and the sensor circuit has a higher electrical resistance. Therefore, it is difficult to accurately detect the wear and chipping of the throw-away tip. If the thickness of the electrically conductive film is greater than 20 µm, a greater stress occurs in the electrically conductive film during the formation thereof, and the residual stress reduces the adhesion of the electrically conductive film 6 to the surface of the substrate.

The electrically conductive film 6 is patterned into a predetermined configuration by a laser irradiation method or the like. For example, the electrically conductive film 6 is patterned parallel to an edge of the throw-away tip defined along an intersection ridge between a rake face and a flank for the formation of the sensor circuit. The sensor circuit typically has a line width of 0.01 mm to 0.1 µm, but the line width thereof may properly be determined depending on the setting of the service life of the throw-away tip. Thus, the sensor circuit can advantageously be insulated from the substrate.

The insulation layers 7, 8 are preferably formed of aluminum oxide and/or zirconium oxide, because these materials are excellent in oxidation resistance and wear resistance.

Figure 4:
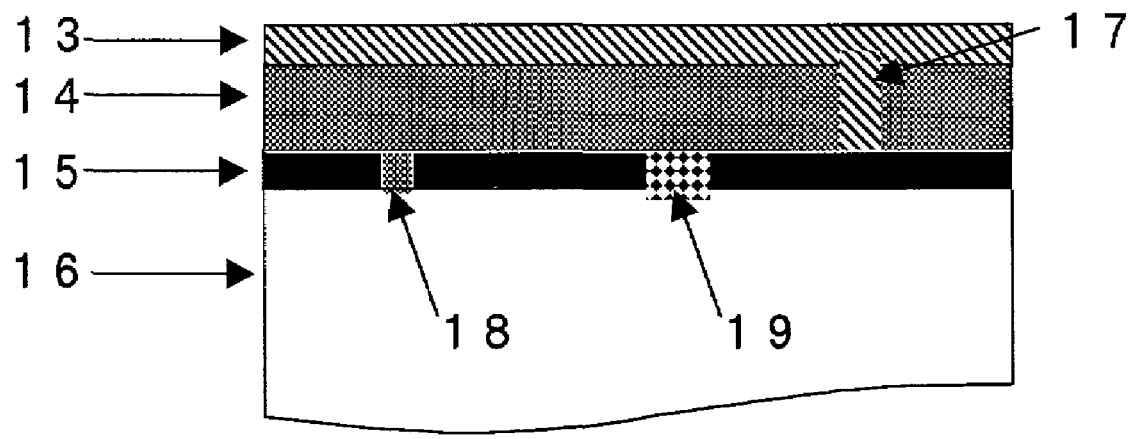
FIG. 4 is a diagram illustrating a cutting tool with a sensor according to a second embodiment of the present invention.

FIG. 4 illustrates a cutting tool with a sensor according to a second embodiment of the present invention. In FIG. 4, there are shown an electrically conductive film 13 (which serves as a sensor circuit), first and second insulation layers 15 and 14, an electrically conductive substrate 16, a defect 17 such as a crack or a pinhole present in the second insulation layer, a defect 18 such as a crack or a pinhole present in the first insulation layer, and a defect 19 such as electrical conductive grains present in the first insulation layer. The second insulation layer 14 has a greater thickness than the first insulation layer 15, so that the defect 18 produced when the first insulation layer 15 is formed can efficiently be covered with the second insulation layer. Thus, a short circuit between the electrically conductive substrate 16 and the electrically conductive circuit can be prevented, thereby ensuring proper function of the sensor circuit.

Figure 5:
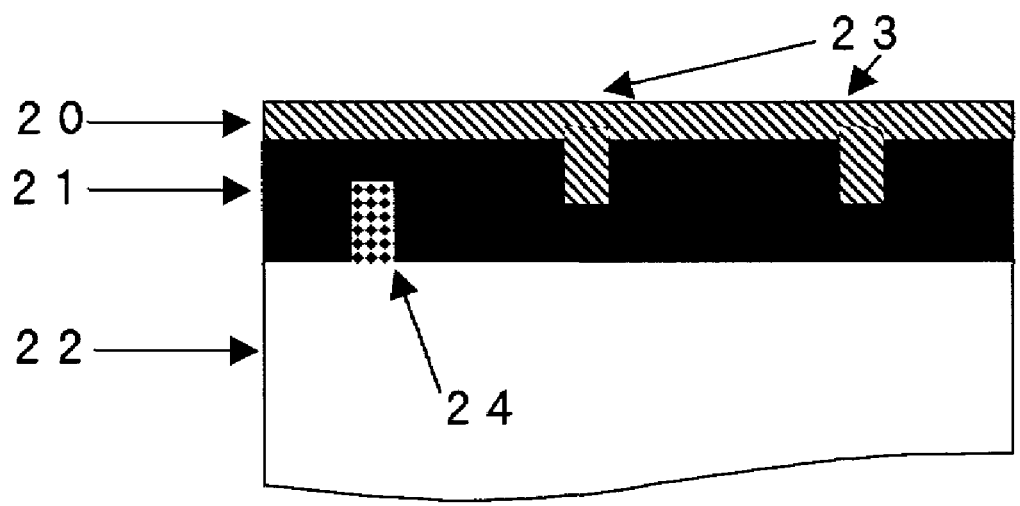
FIG. 5 is a diagram illustrating a cutting tool with a sensor according to a third embodiment of the present invention.

FIG. 5 illustrates a cutting tool with a sensor according to a third embodiment of the present invention. In FIG. 5, there are shown an electrically conductive film 20 (which serves as a sensor circuit), an insulation layer 21, an electrically conductive substrate 22, an electrically conductive film material 23 present in a crack or a pinhole, and an electrically conductive substance 24. The electrically conductive substances 23 and 24 are discontinuous (or do not contact with each other) in the insulation layer 21 between the electrically conductive film 20 and the electrically conductive substrate 22, so that a short circuit between the electrically conductive film 20 and the electrically conductive substrate 22 can be prevented. In this embodiment, it is important that the electrically conductive substances 23, 24 present in the pinhole or the crack are discontinuous along the thickness of the insulation layer 21. Thus, a short circuit between the electrically conductive substrate 22 and the electrically conductive circuit can be prevented, ensuring proper function of the sensor circuit.

Next, an explanation will be given to a method for producing a cutting tool with a sensor according to a fourth embodiment of the present invention. An etching and rinsing process is performed prior to formation of a second insulation layer 7 as shown in FIG. 2, so that defects 11, 12 such as a crack and a pinhole present in a first insulation layer 8 can assuredly be filled with a material for the second insulation layer 7. The interior surface of the pinhole produced in the first insulation layer 8 is etched and cleaned for activation thereof, so that the formation of the second insulation layer 7 and a subsequent layer is facilitated. Therefore, the pinhole in the first insulation layer 8 is easily filled with the material for the second insulation layer 7. Thus, a short circuit between the electrically conductive substrate 9 and the electrically conductive sensor circuit can be prevented, ensuring proper function of the sensor circuit.

Figure 6:
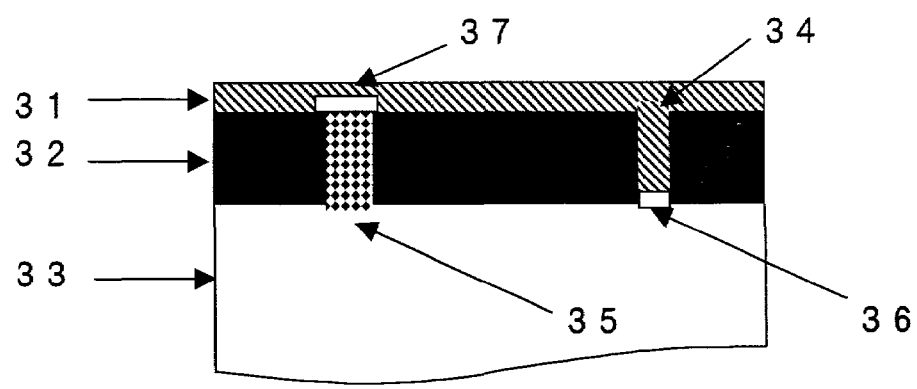
FIG. 6 is a diagram illustrating a cutting tool with a sensor according to a fifth embodiment of the present invention.

FIG. 6 illustrates a method for producing a cutting tool with a sensor according to a fifth embodiment of the present invention. In FIG. 6, there are shown an electrical conductive film 31, an insulation layer 32, an electrically conductive substrate 33, a defect 34 such as a crack or a pinhole, a defect 35 such as electrically conductive grains, an oxidized portion 36 of the substrate in a crack or a pinhole, and an oxidized portion 37 of the electrically conductive grains. By performing an oxidation process, the defect 34 (e.g., the crack or the pinhole) and the defect 35 (e.g., the electrically conductive grains) possibly causing a short circuit are affected by the oxidation, whereby electrically conductive regions are converted to insulative regions. Thus, a short circuit between the electrically conductive substrate 33 and the electrically conductive film 31 can be prevented.

In the oxidation process, the substrate 33 covered with the insulation layer 32 is heated at 600° C. to 1500° C. under the atmospheric pressure in an air atmosphere for 10 to 600 minutes. The oxidation process may be performed in a non-reduction atmosphere such as an oxygen atmosphere, and the internal pressure of an oxidation chamber may be lower or higher than the atmospheric pressure. If the oxidation temperature is lower than 600° C., the defects are not sufficiently affected by the oxidation. If the oxidation temperature is higher than 1500° C., the properties of the electrically conductive substrate 33 per se may be changed. If the oxidation period is shorter than 10 minutes, the defects are not sufficiently affected by the oxidation. If the oxidation period is longer than 600 minutes, the properties of the electrically conductive substrate 33 per se may be changed.

By thus performing the oxidation process, the electrically conductive regions including the defect 34 (e.g., the crack or the pinhole) and the defect 35 (e.g., the electrically conductive grains) possibly causing a short circuit are converted to the insulative regions, whereby the short circuit between the electrically conductive substrate 33 and the electrically conductive film 31 can be prevented.

A method for forming an electrically conductive film on an insulation layer will be explained more specifically in accordance with a sixth embodiment of the present invention.

Usable as the electrically conductive film are a graphite resistor, a chromium metal film, a Ti metal film, a TiN film and a TiC film. The formation of the electrically conductive film is typically achieved by deposition employing a PVD method.

However, the electrically conductive film produced by the deposition is susceptible to wear and separation due to collision of chips and, hence, is not suitable for a tool which is to be used under severe conditions. To overcome this problem, use of an electrically conductive hard film of TiN or TiC is proposed. For the formation of the electrically conductive hard film by the PVD method, a bombardment process is performed prior to the film formation for improvement of the adhesion strength of the film to the substrate. However, the bombardment process requires application of a much higher bias voltage than the film formation process, so that the insulation layer receives a very strong ion impact. This causes partial separation of the insulation layer. Therefore, the electrically conductive substrate and the electrically conductive film are shorted via the separated portion, making it difficult to provide a sensor circuit which has a stable sensor function.

In this embodiment, the electrically conductive film is formed of TiN, TiC, TICN or TiAlN, among which TiN is preferred. This is because TiN has great adhesion to the electrically conductive substrate. In addition, TiN is not reactive with a workpiece. Therefore, the sensor formed of TiN can constantly provide a predetermined electrical resistance value and accurately detect the wear and chipping of the electrically conductive substrate, and the workpiece is free from a surface scratch which may otherwise be caused by a reaction product. Further, TiN is excellent in oxidation resistance, so that the sensor formed of TiN can accurately detect the wear and chipping of the electrically conductive substrate without variations in electrical resistance which may otherwise occur due to production of an oxide.

The formation of the electrically conductive film is achieved by a PVD method (ion plating method: AIP). In the AIP method, an arc discharge is caused between an evaporation target as a cathode and an arc power source for generation and ionization of vapor particles, and the resulting ions are accelerated by applying a negative bias voltage to a substrate to be plated in an atmosphere of an inert gas or a reactive gas. In the ion plating method, a bombardment process for activating a surface of the substrate is typically performed prior to the formation of a film for enhancement of the adhesion strength of the film to the substrate. The bombardment process is typically performed in an inert gas atmosphere (e.g., in a 2.7-Pa argon gas atmosphere). Bombardment with vapor particles is also possible. In the bombardment process, the surface of the substrate to be formed with the film is bombarded with electrons or ions at a chamber temperature of 100° C. to 800° C. at a bias voltage of −300V to −1000V. In the following sixth embodiment, the bombardment process is not performed when the electrically conductive film is formed. That is, the problem of the separation of the film is solved by applying a plating bias voltage after starting a temperature increase without performing the bombardment process. A Ti or TiAl target is used for formation of a TiN film or a TiAlN film. The temperature of the substrate, the deposition pressure, the bias voltage, an arc current and a plating period need to be optimized depending on the material for the substrate, the material for the insulation layer and the thickness of the film to be formed.

Figure 11:
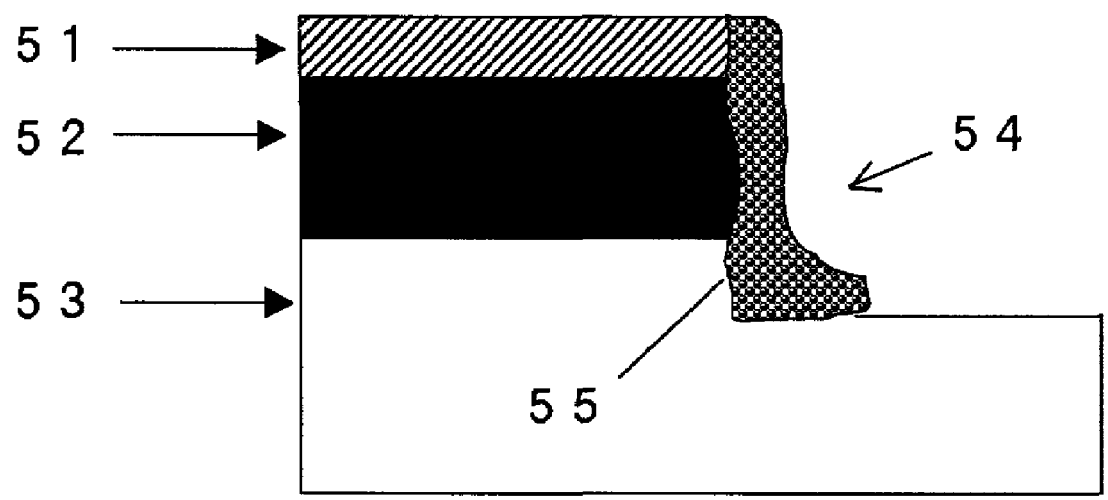
FIG. 11 is a diagram for explaining a problem encountered when a sensor circuit is formed by laser irradiation in accordance with the prior art.

Next, an explanation will be given to a method for forming a sensor circuit by patterning an electrically conductive film in accordance with a seventh embodiment of the present invention. The formation of the sensor circuit is conventionally achieved by a printing method, a photoetching method or a lift-off method, which is less productive and is not practical. Therefore, a laser irradiation method is employed which ensures a higher productivity, a higher machining accuracy and a more flexible circuit design. Even by the laser irradiation method, it is difficult to form a sensor circuit which has a stable sensor function. This is because a portion of the electrically conductive film being laser-machined is liable to evaporate with high laser energy and is liable to melt with low laser energy on the principle of the laser. Where a sensor circuit is to be formed on a tool comprising an electrically conductive substrate 53 covered with an insulation layer 52 by partly removing the insulation layer 52 along the entire thickness thereof by the laser irradiation as shown in FIG. 11, a portion of the electrically conductive layer 52 melted by the laser irradiation partly remains between the electrically conductive substrate 53 and the electrically conductive film 51, causing a short circuit between the electrically conductive substrate 53 and the electrically conductive film 51 in some cases. In FIG. 11, a portion removed by the laser irradiation and the melted portion are denoted by reference numerals 54 and 55, respectively. In FIG. 11, the electrically conductive film 51 and the electrically conductive substrate 53 are shorted via the melted portion 55, so that the sensor circuit does not properly function.

Figure 12:
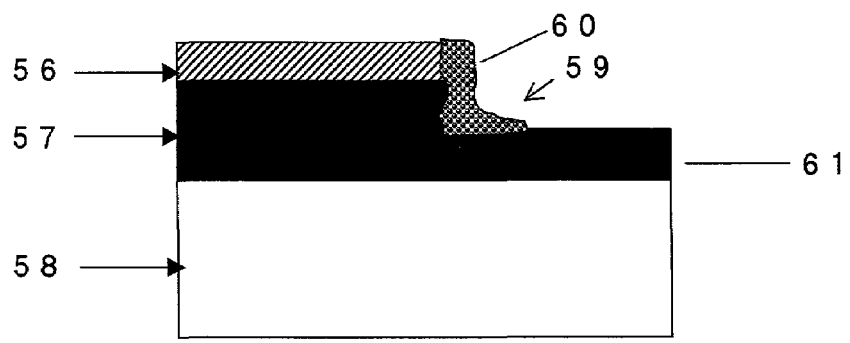
FIG. 12 is a sectional view illustrating a cutting tool with a sensor according to a seventh embodiment of the present invention.

FIG. 12 is a sectional view illustrating a cutting tool with a sensor according to the seventh embodiment. In FIG. 12, there are shown an electrically conductive film 56, a portion 57 of an insulation layer covered with the electrically conductive film, an electrically conductive substrate 58, a portion 59 removed by laser irradiation, a portion 60 melted by the laser irradiation, and a portion 61 of the insulation layer remaining after the removal of the electrically conductive film.

In this embodiment, the insulation layer 57 needs to have a thickness of 0.6 μm to 10 μm. This is because, when the insulation layer 57 is laser-machined to be partly removed, a thickness variation of about 0.5 μm occurs, and a remaining portion of the insulation layer 57 needs to have a thickness of at least 0.1 μm for prevention of a short circuit between the electrically conductive substrate 58 and the electrically conductive film 56.

The electrically conductive film is patterned by YAG laser irradiation or the like so that the sensor circuit is formed on a rake face and a flank of the tool in parallel relation to an edge defined along a ridge of the tool. The sensor circuit typically has a line width of 0.01 mm to 0.5 mm, but may have any line width depending on the setting of the service life of the tool. The electrically conductive film 56 is partly removed by the laser irradiation, so that the thickness (B) of the portion 61 of the insulation layer uncovered with the electrically conductive film 56 is not greater than the thickness (A) of the portion 57 of the insulation layer covered with the electrically conductive film 56 (i.e., A≧B), and is not smaller than 0.1 μm, preferably not smaller than 1 μm. Thus, a short circuit between the electrically conductive substrate 58 and the electrically conductive film 56 can be prevented.

Hence, the tool with the sensor can properly function. Optimum laser irradiation conditions vary depending on the materials for the electrically conductive film 56 and insulation layer 57, and the thickness of the insulation layer 57 to be removed. The thickness of the insulation layer 57 is controlled at an optimum level by variably setting a laser pulse frequency, a laser scanning rate and a laser output. Thus, the tool with the sensor is produced which ensures satisfactory electrical insulation.

EXAMPLE 1

Five samples according to Example 1 (Samples 1) were each produced in the following manner. An $Al_2O_3$—TiC ceramic substrate was employed as an electrically conductive substrate. An aluminum oxide film having a thickness of 3 μm was formed on the substrate by sputtering for formation of a first insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the first insulation layer.

Figure 3:
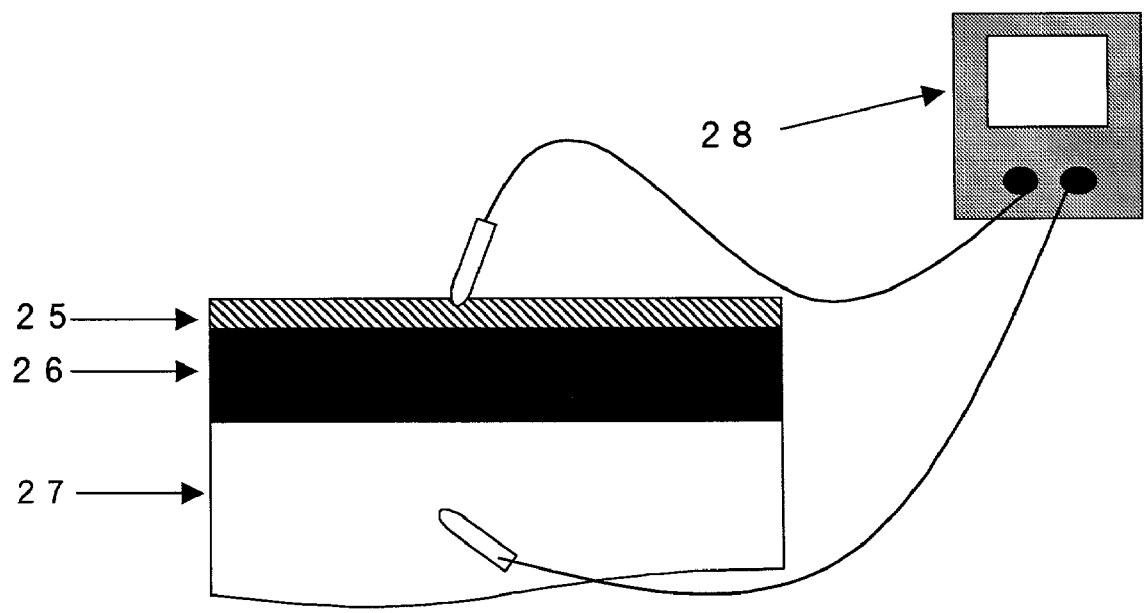
FIG. 3 is a schematic diagram illustrating how to determine the electrical insulation property of the insulation layer.

Subsequently, another aluminum oxide film having a thickness of 3 μm was formed on the first insulation layer by sputtering for formation of a second insulation layer. More specifically, a high-frequency sputtering apparatus employing an $Al_2O_3$ target was used for the sputtering. In an Ar atmosphere, 3-minute pre-sputtering, 12-minute etching on the first insulation layer and 15-minute pre-sputtering for cleaning the target were carried out, followed by 60-minute main sputtering for the formation of the second insulation layer. Thereafter, a TiN film was formed on the second insulation layer by a PVD method for formation of the electrically conductive film, which was in turn patterned for formation of a sensor circuit. The sensor circuit thus produced was advantageously electrically insulated from the substrate. The electrical insulation was evaluated by measuring an electrical resistance as shown in FIG. 3. In FIG. 3, the electrically conductive substrate, the insulation layer (including the first and second insulation layers) and the electrically conductive film are denoted by reference numerals 27, 26 and 25, respectively, and a reference numeral 28 denotes a tester. The results of the measurement of the electrical resistance are shown in Table 1. In four of the five samples, the electrical resistance was 1000 kΩ or higher.

Five samples according to the prior art (Samples 2) were each produced in the following manner. An $Al_2O_3$—TiC ceramic substrate was employed as an electrically conductive substrate. An aluminum oxide film having a thickness of 3 μm was formed on the substrate by sputtering for formation of an insulation layer for insulating an electrically conductive film from the electrically conductive substrate. More specifically, a high-frequency sputtering apparatus employing an Al₂O₃ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the insulation layer. Thereafter, a TiN film was formed on the insulation layer by a PVD method for formation of the electrically conductive film, which was in turn patterned for formation of a sensor circuit. The sensor circuit thus produced was not properly electrically insulated from the substrate. The electrical insulation was evaluated by measuring an electrical resistance as shown in FIG. 3. The results of the measurement of the electrical resistance are shown in Table 1. In none of the five samples, the electrical resistance was 1000 k Ω or higher.

main sputtering for the formation of the second insulation layer. Thereafter, a TiN film was formed on the second insulation layer by a PVD method for formation of the electrically conductive film, which was in turn patterned for formation of a sensor circuit. The sensor circuit thus produced was further advantageously electrically insulated from the substrate. The electrical insulation was evaluated by measuring an electrical resistance as shown in FIG. 3. The results of the measurement of the electrical resistance are shown in Table 2. In all the five samples, the electrical resistance was 1000 k Ω or higher.

Five samples according to a comparative example (Samples 4) were each produced in the following manner. An Al₂O₃—TiC ceramic substrate was employed as an electrically conductive substrate. An aluminum oxide film having a thickness of 3 μm was formed on the substrate by sputtering for formation of a first insulation layer for insulating an electrically conductive film from the electrically conductive substrate. More specifically, a high-frequency

TABLE 1

| Sample | Base | 1st insulation layer | 2nd insulation layer | Conductive film | Electrical resistance (Ω) |
|---|---|---|---|---|---|
| Sample 1 | Al₂O₃—TiC ceramic tool | Al₂O₃ sputtering 3 μm | Al₂O₃ sputtering 3 μm | PVD-TiN | 1000k≧ |
| Sample 1 | Al₂O₃—TiC ceramic tool | Al₂O₃ sputtering 3 μm | Al₂O₃ sputtering 3 μm | PVD-TiN | 1000k≧ |
| Sample 1 | Al₂O₃—TiC ceramic tool | Al₂O₃ sputtering 3 μm | Al₂O₃ sputtering 3 μm | PVD-TiN | 1000k≧ |
| Sample 1 | Al₂O₃—TiC ceramic tool | Al₂O₃ sputtering 3 μm | Al₂O₃ sputtering 3 μm | PVD-TiN | 1000k≧ |
| Sample 1 | Al₂O₃—TiC ceramic tool | Al₂O₃ sputtering 3 μm | Al₂O₃ sputtering 3 μm | PVD-TiN | 900k |
| Sample 2 | Al₂O₃—TiC ceramic tool | Al₂O₃ sputtering 3 μm | — | PVD-TiN | 3 |
| Sample 2 | Al₂O₃—TiC ceramic tool | Al₂O₃ sputtering 3 μm | — | PVD-TiN | 100 |
| Sample 2 | Al₂O₃—TiC ceramic tool | Al₂O₃ sputtering 3 μm | — | PVD-TiN | 100k |
| Sample 2 | Al₂O₃—TiC ceramic tool | Al₂O₃ sputtering 3 μm | — | PVD-TiN | 0.3 |
| Sample 2 | Al₂O₃—TiC ceramic tool | Al₂O₃ sputtering 3 μm | — | PVD-TiN | 500k |

EXAMPLE 2

Five samples according to Example 2 (Samples 3) were each produced in the following manner. An Al₂O₃—TiC ceramic substrate was employed as an electrically conductive substrate. An aluminum oxide film having a thickness of 3 μm was formed on the substrate by sputtering for formation of a first insulation layer for insulating an electrically conductive film from the electrically conductive substrate. More specifically, a high-frequency sputtering apparatus employing an Al₂O₃ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the first insulation layer. Subsequently, another aluminum oxide film having a thickness of 5 μm was formed on the first insulation layer by sputtering for formation of a second insulation layer. More specifically, a high-frequency sputtering apparatus employing an Al₂O₃ target was used for the sputtering. In an Ar atmosphere, 3-minute pre-sputtering, 12-minute etching on the first insulation layer and 15-minute pre-sputtering for cleaning the target were carried out, followed by 100-minute sputtering apparatus employing an Al₂O₃ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the first insulation layer. Subsequently, another aluminum oxide film having a thickness of 3 μm was formed on the first insulation layer by sputtering for formation of a second insulation layer. More specifically, a high-frequency sputtering apparatus employing an Al₂O₃ target was used for the sputtering. In an Ar atmosphere, 3-minute pre-sputtering, 12-minute etching on the first insulation layer and 15-minute pre-sputtering for cleaning the target were carried out, followed by 60-minute main sputtering for the formation of the second insulation layer. Thereafter, a TiN film was formed on the second insulation layer by a PVD method for formation of the electrically conductive film, which was in turn patterned for formation of a sensor circuit. The electrical insulation was evaluated by measuring an electrical resistance as shown in FIG. 3. The results of the measurement of the electrical resistance are shown in Table 2. In four of the five samples, the electrical resistance was 1000 k Ω or higher.

TABLE 2

| Sample | Base | 1st insulation layer | 2nd insulation layer | Conductive film | Electrical resistance (Ω) |
|---|---|---|---|---|---|
| Sample 3 | $Al_2O_3$—TiC ceramic tool | $Al_2O_3$ sputtering 3 μm | $Al_2O_3$ sputtering 5 μm | PVD-TiN | 1000k≧ |
| Sample 3 | $Al_2O_3$—TiC ceramic tool | $Al_2O_3$ sputtering 3 μm | $Al_2O_3$ sputtering 5 μm | PVD-TiN | 1000k≧ |
| Sample 3 | $Al_2O_3$—TiC ceramic tool | $Al_2O_3$ sputtering 3 μm | $Al_2O_3$ sputtering 5 μm | PVD-TiN | 1000k≧ |
| Sample 3 | $Al_2O_3$—TiC ceramic tool | $Al_2O_3$ sputtering 3 μm | $Al_2O_3$ sputtering 5 μm | PVD-TiN | 1000k≧ |
| Sample 3 | $Al_2O_3$—TiC ceramic tool | $Al_2O_3$ sputtering 3 μm | $Al_2O_3$ sputtering 5 μm | PVD-TiN | 1000k≧ |
| Sample 4 | $Al_2O_3$—TiC ceramic tool | $Al_2O_3$ sputtering 3 μm | $Al_2O_3$ sputtering 3 μm | PVD-TiN | 1000k≧ |
| Sample 4 | $Al_2O_3$—TiC ceramic tool | $Al_2O_3$ sputtering 3 μm | $Al_2O_3$ sputtering 3 μm | PVD-TiN | 1000k≧ |
| Sample 4 | $Al_2O_3$—TiC ceramic tool | $Al_2O_3$ sputtering 3 μm | $Al_2O_3$ sputtering 3 μm | PVD-TiN | 1000k≧ |
| Sample 4 | $Al_2O_3$—TiC ceramic tool | $Al_2O_3$ sputtering 3 μm | $Al_2O_3$ sputtering 3 μm | PVD-TiN | 1000k≧ |
| Sample 4 | $Al_2O_3$—TiC ceramic tool | $Al_2O_3$ sputtering 3 μm | $Al_2O_3$ sputtering 3 μm | PVD-TiN | 900k |

EXAMPLE 3

A sample according to Example 3 was produced in the following manner. An $Al_2O_3$—TiC ceramic substrate was employed as an electrically conductive substrate. An aluminum oxide film having a thickness of 1 μm was formed on the substrate by sputtering for formation of a first insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 20-minute main sputtering for the formation of the first insulation layer. Subsequently, another aluminum oxide film having a thickness of 5 μm was formed on the first insulation layer by sputtering for formation of a second insulation layer. More specifically, a high-frequency sputtering apparatus employing an $Al_2O_3$ target was used for the sputtering. In an Ar atmosphere, 3-minute pre-sputtering, 12-minute etching on the first insulation layer and 15-minute pre-sputtering for cleaning the target were carried out, followed by 100-minute main sputtering for the formation of the second insulation layer. Thereafter, a TiN film was formed on the second insulation layer by a PVD method for formation of the electrically conductive film, which was in turn patterned for formation of a sensor circuit. Then, a cross section of the sensor circuit thus produced was observed, and it was confirmed that the electrical conductive film material 23 and the electrically conductive substance 24 present in the pinhole and the crack in the insulation layer were discontinuous along the thickness of the insulation layer as shown in FIG. 5.

EXAMPLE 4

Five samples according to Example 4 (Samples 5) were each produced in the following manner. A substrate for a K-type cemented carbide tool was employed as an electrically conductive substrate. An aluminum oxide film having a thickness of 3 μm was formed on the substrate by sputtering for formation of a first insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the first insulation layer. Subsequently, another aluminum oxide film having a thickness of 3 μm was formed on the first insulation layer by sputtering for formation of a second insulation layer. More specifically, a high-frequency sputtering apparatus employing an $Al_2O_3$ target was used for the sputtering. In an Ar atmosphere, 3-minute pre-sputtering, 12-minute etching on the first insulation layer and 15-minute pre-sputtering for cleaning the target were carried out, followed by 60-minute main sputtering for the formation of the second insulation layer. Thereafter, a TiN film was formed on the second insulation layer by a PVD method for formation of the electrically conductive film, which was in turn patterned for formation of a sensor circuit. The sensor circuit thus produced was advantageously electrically insulated from the substrate. The electrical insulation was evaluated by measuring an electrical resistance as shown in FIG. 3. The results of the measurement of the electrical resistance are shown in Table 3. In all the five samples, the electrical resistance was 1000 k Ω or higher.

Five samples according to a comparative example (Samples 6) were each produced in the following manner. A substrate for a K-type cemented carbide tool was employed as an electrically conductive substrate. An aluminum oxide film having a thickness of 3 μm was formed on the substrate by sputtering for formation of a first insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 60-minute main sputtering for the formation of the first insulation layer. Subsequently, another aluminum oxide film having a thickness of 3 μm was formed on the first insulation layer by sputtering for formation of a second insulation layer. More specifically, a high-frequency sputtering apparatus employing an $Al_2O_3$ target was used for the sputtering. In an Ar atmosphere, 60-minute main sputtering was carried out for the formation of the second insulation layer without carrying out etching and pre-sputtering. Thereafter, a TiN film was formed on the second insulation layer by a PVD method for formation of the electrically conductive film, which was in turn patterned for formation of a sensor circuit. The electrical insulation was evaluated by measuring an electrical resistance as shown in FIG. 3. The results of the measurement of the electrical resistance are shown in Table 3. In three of the five samples, the electrical resistance was 1000 k Ω or higher.

TABLE 3

| Sample | Base | 1st insulation layer | Etching for 2nd insulation layer | 2nd insulation layer | Conductive film | Electrical resistance (Ω) |
|---|---|---|---|---|---|---|
| Sample 5 | K-type cemented carbide tool | $Al_2O_3$ sputtering 3 μm | Yes | $Al_2O_3$ sputtering 3 μm | PVD-TiN | 1000k≧ |
| Sample 5 | K-type cemented carbide tool | $Al_2O_3$ sputtering 3 μm | Yes | $Al_2O_3$ sputtering 3 μm | PVD-TiN | 1000k≧ |
| Sample 5 | K-type cemented carbide tool | $Al_2O_3$ sputtering 3 μm | Yes | $Al_2O_3$ sputtering 3 μm | PVD-TiN | 1000k≧ |
| Sample 5 | K-type cemented carbide tool | $Al_2O_3$ sputtering 3 μm | Yes | $Al_2O_3$ sputtering 3 μm | PVD-TiN | 1000k≧ |
| Sample 5 | K-type cemented carbide tool | $Al_2O_3$ sputtering 3 μm | Yes | $Al_2O_3$ sputtering 3 μm | PVD-TiN | 1000k≧ |
| Sample 6 | K-type cemented carbide tool | $Al_2O_3$ sputtering 3 μm | No | $Al_2O_3$ sputtering 3 μm | PVD-TiN | 1000k≧ |
| Sample 6 | K-type cemented carbide tool | $Al_2O_3$ sputtering 3 μm | No | $Al_2O_3$ sputtering 3 μm | PVD-TiN | 1000k≧ |
| Sample 6 | K-type cemented carbide tool | $Al_2O_3$ sputtering 3 μm | No | $Al_2O_3$ sputtering 3 μm | PVD-TiN | 1000k≧ |
| Sample 6 | K-type cemented carbide tool | $Al_2O_3$ sputtering 3 μm | No | $Al_2O_3$ sputtering 3 μm | PVD-TiN | 100 |
| Sample 6 | K-type cemented carbide tool | $Al_2O_3$ sputtering 3 μm | No | $Al_2O_3$ sputtering 3 μm | PVD-TiN | 900k |

EXAMPLE 5–1

Figure 7:
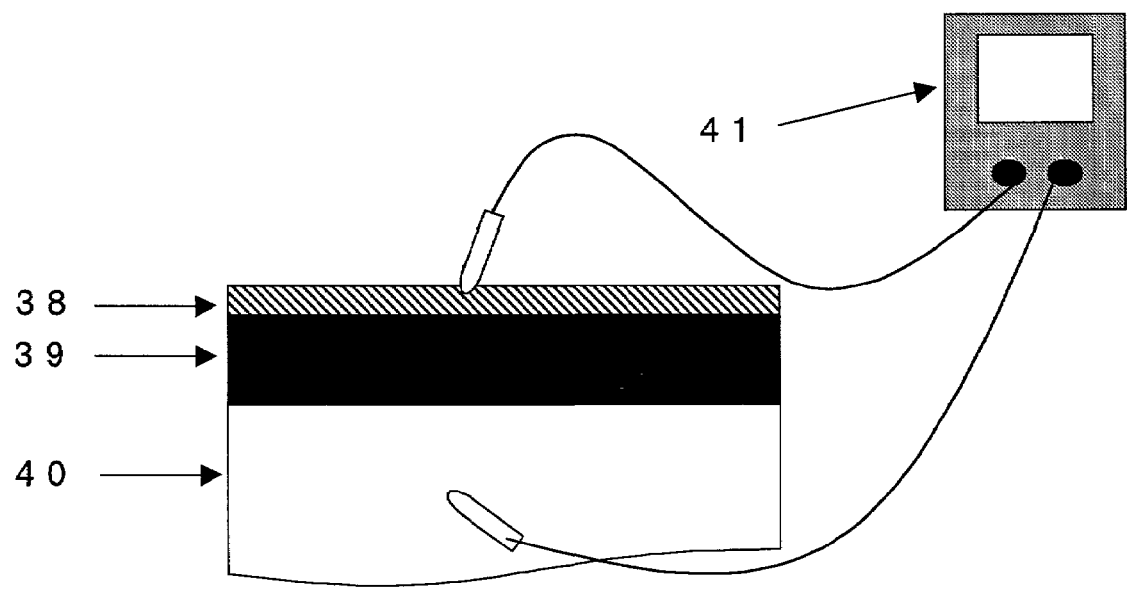
FIG. 7 is a schematic diagram for explaining how to determine the electrical insulation property of an insulation layer between an electrically conductive substrate and an electrically conductive film.

Five samples according to Example 5–1 (Samples 7) were each produced in the following manner. An $Al_2O_3$—TiC ceramic substrate was used as an electrically conductive substrate. An aluminum oxide film having a thickness of 5 μm was formed on the substrate by sputtering for formation of an insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 100-minute main sputtering for the formation of the insulation layer. Subsequently, the substrate covered with the insulation layer was subjected to an oxidation process at 900° C. in an air atmosphere under the atmospheric pressure for 60 minutes. Thereafter, a TiN film was formed on the insulation layer by a PVD method for formation of the electrically conductive film. The electrical insulation between the electrically conductive substrate and the electrically conductive film was evaluated by measuring an electrical resistance with the use of a commercially available tester as shown in FIG. 7. In FIG. 7, the electrically conductive substrate, the insulation layer, the electrically conductive film and the tester are denoted by reference numerals 40, 39, 38 and 41, respectively. The results of the measurement of the electrical resistance are shown in Table 4. In three of the five samples, the electrical resistance was 1000 k Ω or higher.

Five samples according to the prior art (Samples 8) were each produced in the following manner. An $Al_2O_3$—TiC ceramic substrate was used as an electrically conductive substrate. An aluminum oxide film having a thickness of 5 μm was formed on the substrate by sputtering for formation of an insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 100-minute main sputtering for the formation of the insulation layer. Thereafter, a TiN film was formed on the insulation layer by a PVD method for formation of the electrically conductive film. The electrical insulation was evaluated in the aforesaid manner as shown in FIG. 7. The results are shown in Table 4. In none of the five samples, the electrical resistance was 1000 k Ω or higher.

TABLE 4

| Sample | Base | Insulation layer | Oxidation | Conductive film | Electrical resistance (Ω) |
|---|---|---|---|---|---|
| Sample 7 | $Al_2O_3$—TiC ceramic tool | $Al_2O_3$ sputtering 5 μm | Yes | PVD-TiN | 1000k≧ |
| Sample 7 | $Al_2O_3$—TiC ceramic tool | $Al_2O_3$ sputtering 5 μm | Yes | PVD-TiN | 1000k≧ |
| Sample 7 | $Al_2O_3$—TiC ceramic tool | $Al_2O_3$ sputtering 5 μm | Yes | PVD-TiN | 1000k≧ |
| Sample 7 | $Al_2O_3$—TiC ceramic tool | $Al_2O_3$ sputtering 5 μm | Yes | PVD-TiN | 950k |
| Sample 7 | $Al_2O_3$—TiC ceramic tool | $Al_2O_3$ sputtering 5 μm | Yes | PVD-TiN | 300k |
| Sample 8 | $Al_2O_3$—TiC ceramic tool | $Al_2O_3$ sputtering 5 μm | No | PVD-TiN | 3 |
| Sample 8 | $Al_2O_3$—TiC ceramic tool | $Al_2O_3$ sputtering 5 μm | No | PVD-TiN | 10 |
| Sample 8 | $Al_2O_3$—TiC ceramic tool | $Al_2O_3$ sputtering 5 μm | No | PVD-TiN | 100k |
| Sample 8 | $Al_2O_3$—TiC ceramic tool | $Al_2O_3$ sputtering 5 μm | No | PVD-TiN | 0.3 |
| Sample 8 | $Al_2O_3$—TiC ceramic tool | $Al_2O_3$ sputtering 5 μm | No | PVD-TiN | 900k |

EXAMPLE 5–2

Five samples according to Example 5–2 (Samples 9) were each produced in the following manner. A substrate for a K-type cemented carbide coated tool was used as an electrically conductive substrate. The substrate was a WC90%–Co10% substrate coated with TiCN by a CVD method. An aluminum oxide film having a thickness of 2 μm was formed on the substrate by a CVD method for formation of an insulation layer. In the CVD method, $H_2$ was used as a carrier gas, and $CO_2$, HCl and $AlCl_3$ were used in combination as a reaction gas. A film depositing temperature was 1050° C., and an internal pressure of a CVD chamber was 60 mbar. Thereafter, the substrate covered with the insulation layer was subjected to an oxidation process at 800° C. in an air atmosphere under the atmospheric pressure for 20 minutes. Then, a TiN film was formed on the insulation layer by a PVD method for formation of an electrically conductive film, which was in turn patterned for formation of a sensor circuit. Thus, a tool with a sensor was produced which ensured satisfactory electrical insulation between the electrically conductive substrate and the electrically conductive film. The electrical insulation was evaluated by measuring an electrical resistance in the same manner as in Example 5–1. The results are shown in Table 5. In three of the five samples, the electrical resistance was 1000 k Ω or higher.

Five samples according to the prior art (Samples 10) were each produced in the following manner. A substrate for a K-type cemented carbide coated tool was used as an electrically conductive substrate. The substrate was a WC90%–Co10% substrate coated with TiCN by a CVD method. An aluminum oxide film having a thickness of 2 μm was formed on the substrate by a CVD method for formation of an insulation layer. In the CVD method, $H_2$ was used as a carrier gas, and $CO_2$, HCl and $AlCl_3$ were used in combination as a reaction gas. A film depositing temperature was 1050° C., and an internal pressure of a CVD chamber was 60 mbar. Then, a TiN film was formed on the insulation layer by a PVD method for formation of an electrically conductive film, which was in turn patterned for formation of a sensor circuit. The electrical insulation was evaluated by measuring an electrical resistance in the same manner as in Example 5–1. The results are shown in Table 5. In none of the five samples, the electrical resistance was 1000 k Ω or higher.

cemented carbide coated tool are denoted by reference numerals 43 and 44, respectively. A reference numeral 46 denotes an oxidized portion of the electrically conductive substrate (TiCN film) in a crack.

Figure 9:
FIG. 9 is a graph illustrating the results of an EDS analysis performed on a portion of the insulation layer covering a crack.

The result of the EDS analysis on the filled crack portion is shown in FIG. 9. In FIG. 9, a peak appearing at 0.25 keV, a peak appearing at 1.48 keV and a peak appearing at 4.50 keV indicate oxygen, aluminum and titanium, respectively. Thus, it is confirmed that a substance deposited in the crack was oxides of Ti and Al. The result of the EDS analysis shows that Ti which is a component of the coating on the electrically conductive substrate of the cemented carbide coated tool was oxidized. Therefore, the crack which may cause a short circuit was insulated from the electrically conductive substrate and the electrically conductive film, so that the tool with the sensor thus produced ensured satisfactory insulation between the electrically conductive substrate and the electrically conductive film.

EXAMPLE 6

Two samples according to Example 6 (Samples 11) were each produced in the following manner. An $Al_2O_3$—TiC ceramic substrate was employed as an electrically conductive substrate. An aluminum oxide film having a thickness of 5 μm was formed on the substrate by sputtering for formation of an insulation layer for insulating an electrically conductive film from the electrically conductive substrate. More specifically, a high-frequency sputtering apparatus employing an $Al_2O_3$ target was used for the sputtering. In an Ar atmosphere, 3-minute pre-sputtering, 12-minute etching on the substrate and 15-minute pre-sputtering for cleaning the target were carried out, followed by 100-minute main sputtering for the formation of the insulation layer. Thereafter, a TiN film was formed by means of an AIP apparatus for formation of the electrically conductive film. In the case of Samples 11 of this example, the bombardment process

TABLE 5

| Sample | Base | Insulation layer | Oxidation | Conductive film | Electrical resistance (Ω) |
|---|---|---|---|---|---|
| Sample 9 | Cemented carbide coated tool | CVD-$Al_2O_3$ 2 μm | Yes | PVD-TiN | 80k |
| Sample 9 | Cemented carbide coated tool | CVD-$Al_2O_3$ 2 μm | Yes | PVD-TiN | 1000k≧ |
| Sample 9 | Cemented carbide coated tool | CVD-$Al_2O_3$ 2 μm | Yes | PVD-TiN | 1000k≧ |
| Sample 9 | Cemented carbide coated tool | CVD-$Al_2O_3$ 2 μm | Yes | PVD-TiN | 400k |
| Sample 9 | Cemented carbide coated tool | CVD-$Al_2O_3$ 2 μm | Yes | PVD-TiN | 1000k≧ |
| Sample 10 | Cemented carbide coated tool | CVD-$Al_2O_3$ 2 μm | No | PVD-TiN | 7 |
| Sample 10 | Cemented carbide coated tool | CVD-$Al_2O_3$ 2 μm | No | PVD-TiN | 10 |
| Sample 10 | Cemented carbide coated tool | CVD-$Al_2O_3$ 2 μm | No | PVD-TiN | 3 |
| Sample 10 | Cemented carbide coated tool | CVD-$Al_2O_3$ 2 μm | No | PVD-TiN | 0.3 |
| Sample 10 | Cemented carbide coated tool | CVD-$Al_2O_3$ 2 μm | No | PVD-TiN | 500k |

The samples obtained after the insulation layer was subjected to the oxidation process were each analyzed by means of a scanning electron microscope (SEM) and an energy dispersive spectroscopy (EDS). The SEM was ABT-60 available from K.K. Topcon, and the EDS was EDAX•PV9800S-UTW available from EDAX Japan K.K. As can be seen from an SEM photograph (FIG. 8) of a section of the insulation layer subjected to the oxidation process, the crack was filled after the oxidation process.

Figure 8:
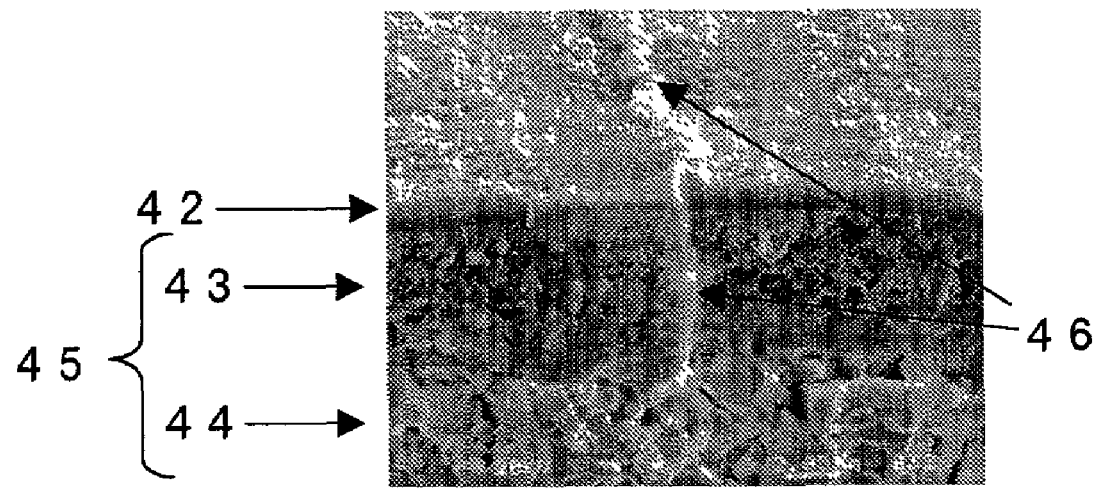
FIG. 8 is an SEM photograph of a section of the insulation layer after subjected to an oxidation process.

In FIG. 8, the insulation layer and the electrically conductive substrate (cemented carbide coated tool) are denoted by reference numerals 42 and 45, respectively, and the coating (TiCN film) and the substrate (WC-Co) of the was not performed after the start of temperature increase (with application of a bias voltage of 0V), and a bias voltage of 30V was applied for the formation of the electrically conductive film. Conditions employed for the formation of the electrically conductive film were as follows. An AIP process was performed at a substrate temperature of 500° C. in a 4.0-Pa nitrogen atmosphere at a bias voltage of 30V at an arc current of 150A for a period of 15 minutes. Then, the electrically conductive film was patterned for formation of a sensor circuit. As a result, Samples 11 provided satisfactory insulation between the electrically conductive substrate and the electrically conductive film (sensor circuit) without separation of the insulation layer. The results of measurement of an electrical resistance are shown in Table 6. In both of the two samples, the electrical resistance was 1000 k Ω or higher.

TABLE 6

| Sample | Base | Insulation layer | Bias voltage (V) Start of temperature increase | Bombardment | Formation of conductive film | Electrical resistance (Ω) |
|---|---|---|---|---|---|---|
| Sample 11 | Al₂O₃—TiC ceramic tool | Al₂O₃ sputtering 5 μm | 0 | 0 | −30 | 1000k≧ |
| Sample 11 | Al₂O₃—TiC ceramic tool | Al₂O₃ sputtering 5 μm | 0 | 0 | −30 | 1000k≧ |
| Sample 12 | Al₂O₃—TiC ceramic tool | Al₂O₃ sputtering 5 μm | 0 | −500 | −30 | 5.0 |
| Sample 12 | Al₂O₃—TiC ceramic tool | Al₂O₃ sputtering 5 μm | 0 | −500 | −30 | 0.6 |

Figure 10:
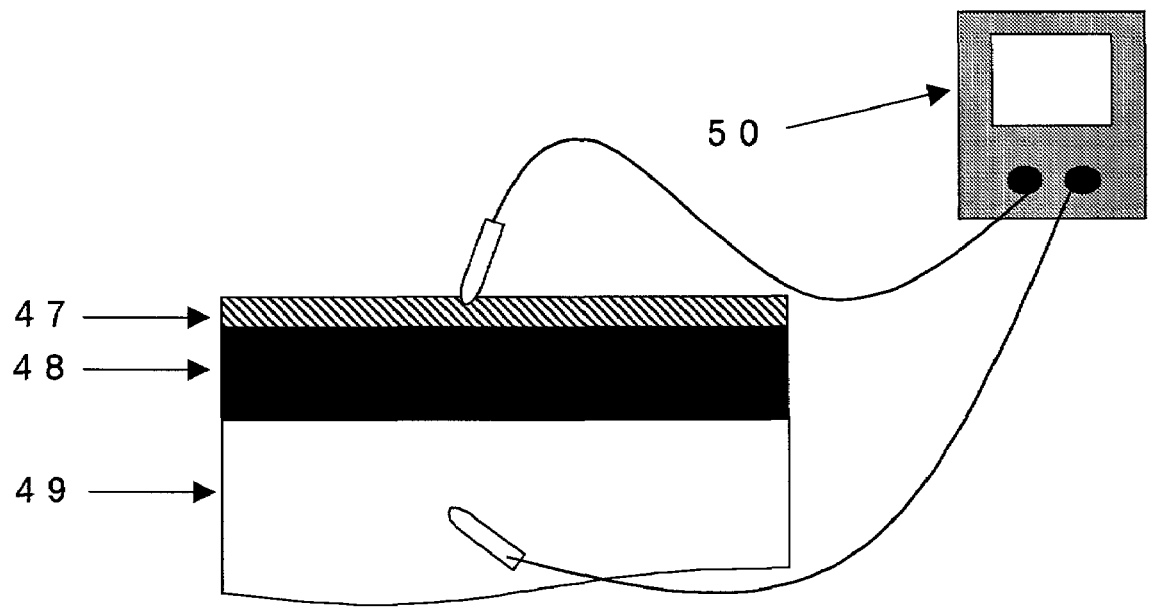
FIG. 10 is a schematic diagram for explaining how to measure an electrical resistance in Example 6.

Two samples according to the prior art (Samples 12) were each produced in substantially the same manner as Samples 11, except that a bias voltage of 500V was applied for the bombardment process after the start of temperature increase (with application of a bias voltage of 0V) and then a bias voltage of −30V was applied for the formation of the electrically conductive film. Conditions employed for the bombardment process were as follows. The bombardment process was performed in a 2.7-Pa Ar atmosphere at a bias voltage of 500V at a filament current of 30 A. Conditions employed for the formation of the electrically conductive film were the same as those employed for Samples 11. Samples 12 each suffered from partial peeling of the insulation layer and poorer electrical insulation with a lower electrical resistance. The results of the measurement of the electrical resistance are shown in Table 6. In neither of the two samples, the electrical resistance was 1000 k Ω or higher. The measurement of the electrical resistance was performed as shown in FIG. 10. In FIG. 10, the electrically conductive substrate, the insulation layer and the electrically conductive film are denoted by reference numerals 49, 48 and 47, respectively, and a reference numeral 50 denotes a tester.

EXAMPLE 7

Samples according to Example 7 (Samples 13, 14, 15) and a sample according to the prior art (Sample 16) were each produced in the following manner. An Al₂O₃—TiC ceramic substrate was employed as the electrically conductive substrate 58. An aluminum oxide film having a thickness of 5 μm was formed on the substrate by sputtering for formation of the insulation layer 57 for insulating the electrically conductive film 56 from the electrically conductive substrate 58. More specifically, a high-frequency sputtering apparatus was employed for the sputtering. In an Ar atmosphere, 3-minute pre-sputtering, 12-minute etching on the substrate and 15-minute pre-sputtering for cleaning a target were carried out, followed by 100-minute main sputtering for the formation of the insulation layer. Thereafter, a 1-μm thick TiN film was formed on the insulation layer by an AIP method with the use of a titanium target for formation of the electrically conductive film 56. The AIP was performed in a 4-Pa nitrogen atmosphere at a substrate temperature of 500° C. for a period of 15 minutes.

Figure 13:
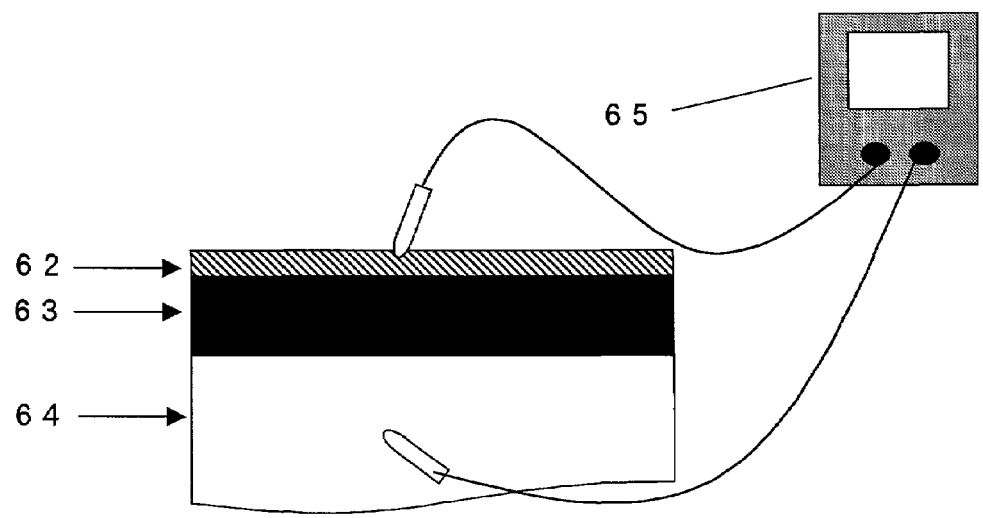
FIG. 13 is a diagram for explaining how to measure an electrical resistance in Example 7.

Subsequently, the electrically conductive film 56 was patterned by laser irradiation by means of a YAG laser apparatus, so that the insulation layer 57 was removed to the middle of the thickness thereof as shown in FIG. 12. The laser irradiation was performed at a laser pulse frequency of 35 kHz at a laser scanning rate of 100 mm/sec. A laser irradiation condition (laser output), the thickness of the portion of the insulation layer 57 uncovered with the electrically conductive film after the removal by the laser irradiation and an electrical resistance for each of the samples are shown in Table 7. The electrical resistance was measured as shown in FIG. 13. In FIG. 13, the electrically conductive film, the insulation layer and the electrically conductive substrate are denoted by reference numerals 62, 63 and 64, respectively, and a reference numeral 65 denotes a tester.

The portion 57 of the insulation layer covered with the electrically conductive film 56 had a thickness of 5 μm in Samples 13 to 16, and the portion 61 of the insulation layer uncovered with the electrically conductive film 56 after the removal had a thickness of 5 μm in Sample 13, 3 μm in Sample 14, 0.1 μm in Sample 15, and 0 μm in Sample 16. An electrical resistance for each of the samples is shown in Table 7.

TABLE 7

| Sample | Thickness A (μm) of insulation layer*¹ | Thickness B (μm) of insulation layer*² | Laser machining condition (Laser output) | Electrical resistance (Ω) |
|---|---|---|---|---|
| Sample 13 | 5 | 5 | 11.3 | 1000k≧ |
| Sample 14 | 5 | 3 | 14.8 | 1000k≧ |
| Sample 15 | 5 | 0.1 | 19.0 | 300k |
| Sample 16 | 5 | 0 | 24.0 | 0.3 |

*¹: Portion of insulation layer covered with electrically conductive film.
*²: Portion of insulation layer uncovered with electrically conductive film.

In the case of Sample 16 according to the prior art in which the portion 61 of the insulation layer uncovered with the electrically conductive film 56 after the removal has a thickness of 0 μm, the electrical resistance was 0.3 Ω, indicating that the electrically conductive substrate and the electrically conductive film were shorted. In the case of Samples 13, 14 and 15 according to Example 7, the electrical resistance was higher than in the prior art, and sensor tools thus produced stably ensured satisfactory electrical insulation between the electrically conductive substrate 58 and the electrically conductive film 56.

It should be understood that the present invention be not limited to the embodiments described above but various modifications may be made within the scope of the invention defined by the appended claims.

The application claims priority benefits under the treaty of Japanese Patent Applications Serial No. 2001-96104, No. 2001-96105, No. 2001-96106 and No. 2001-96107, all filed with the Japanese Patent Office on Mar. 29, 2001, the disclosure of which is incorporated herein by reference.

What is claimed is:

1. A cutting tool with a sensor comprising:
   an electricafly conductive substrate;
   an insulation film provided on a surface of the electrically conductive substrate; and
   a sensor circuit of an electrically conductive film provided on the insulation film,
   wherein the insulation film has a defect eliminating arrangement for eliminating a defect possibly present therein and impairing an insulation property thereof,
   wherein the defect eliminating arrangement of the insulation film comprises at least two consecutive insulation layers,
   wherein one of the at least two insulation layers adjacent to the sensor circuit has a greater thickness than the other insulation layer adjacent to the electrically conductive substrate.

2. A cutting tool with a sensor comprising:
   an electrically conductive substrate;
   an insulation film provided on a surface of the electrically conductive substrate; and
   a sensor circuit of an electrically conductive film provided on the insulation film,
   wherein the insulation film has a defect eliminating arrangement for eliminating a defect possibly present therein and impairing an insulation property thereof,
   wherein a surface of the insulation film is selectively covered with the sensor circuit of the electrically conductive film, and a thickness (A) of a portion of the insulation film covered with the electrically conductive film and a thickness (B) of a portion of the insulation film uncovered with the electrically conductive film satisfy the following expression:

$$A \geq B \geq 0.1 \ \mu m.$$

3. A cutting tool with a sensor as set forth in claim 2, wherein the defect eliminating arrangement of the insulation film comprises at least two consecutive insulation layers.

4. A cutting tool with a sensor as set forth in claim 3, wherein the insulation layers are each composed of a material selected from the group consisting of aluminum oxide and zirconium oxide.

5. A cutting tool with a sensor as set forth in claim 2, wherein the defect eliminating arrangement is such that electrically conductive substances possibly present in the insulation film are discontinuous along the thickness of the insulation film.

* * * * *